United States Patent [19]
Razzano

[11] 3,978,104
[45] Aug. 31, 1976

[54] PROCESS FOR PRODUCING DIORGANOPOLYSILOXANE OILS

[75] Inventor: John S. Razzano, Watervliet, N.Y.

[73] Assignee: General Electric Company, Waterford, N.Y.

[22] Filed: May 5, 1975

[21] Appl. No.: 574,334

Related U.S. Application Data

[63] Continuation-in-part of Ser. No. 463,435, April 24, 1974.

[52] U.S. Cl. .......................... 260/448.2 E
[51] Int. Cl.² .......................... C07F 7/08
[58] Field of Search ................ 260/448.2 E

[56] References Cited
UNITED STATES PATENTS

| | | | |
|---|---|---|---|
| 2,769,829 | 11/1956 | Dobay | 260/448.2 E |
| 2,979,519 | 4/1961 | Pierce et al. | 260/448.2 E |
| 3,477,988 | 11/1969 | Ostrozynski | 260/448.2 E X |
| 3,479,320 | 11/1969 | Bostick | 260/448.2 E X |
| 3,532,731 | 10/1970 | Hittmair et al. | 260/448.2 E |
| 3,779,987 | 12/1973 | Razzano | 260/448.2 E X |

*Primary Examiner*—Paul F. Shaver
*Attorney, Agent, or Firm*—Granville M. Pine; Edward A. Hedman; John L. Young

[57] ABSTRACT

Diorganopolysiloxane oils having a viscosity from 50 to 100,000 centipoise at 25°C., where at least one of the organo substituent groups on the silicon atoms is an aliphatic radical of three or more carbon atoms are produced by reacting a cyclic tetrasiloxane or a mixture of cyclic tetrasiloxanes at a temperature in the range of 0° to 90°C. and in the presence of 5 to 300 parts per million of a catalyst selected from cesium hydroxide, silanolates thereof, or a compound of the formula,

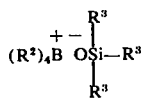

wherein $R^2$ is alkyl of 1 to 8 carbon atoms, cycloalkyl of 4 to 8 carbon atoms and phenyl, B is nitrogen or phosphorous, $R^3$ is alkyl of 1 to 8 carbon atoms, cycloalkyl of 4 to 8 carbon atoms, phenyl, siloxane chains of the unit formula $R_a^4 SiO_{4-a/2}$ and mixtures thereof, wherein $R^4$ is monovalent hydrocarbon or halogenated monovalent hydrocarbon, and $a$ is from 1.5 to 2.5.

13 Claims, No Drawings

PROCESS FOR PRODUCING DIORGANOPOLYSILOXANE OILS

CROSS REFERENCE TO RELATED APPLICATION

This application is a continuation-in-part of copending application Ser. No. 463,435, filed Apr. 24, 1974.

FIELD OF THE INVENTION

This invention relates to a process for the preparation of low viscosity silicone oils from cyclic tetrasiloxanes. More specifically, the present invention relates to a process for producing low molecular weight diorganopolysiloxane oils from cyclic tetrasiloxanes, where at least one of the organo groups appended to the silicon atoms in the diorganopolysiloxane has three carbon atoms or more.

BACKGROUND OF THE INVENTION

Silicone oils, and especially fluorosilicone oils, of low viscosity have found utility in a variety of applications including antifoams and as a base oil for non-curing sealants and greases. These oils have been made in the past by the acidic catalyzed polymerization of the silicone, e.g., fluorosilicone, cyclic siloxane trimer. The cyclic trimer, however, is more difficult and expensive to prepare than the corresponding cyclic tetramer, but prior references, e.g., Pierce et al., U.S. Pat. No. 2,979,519, have asserted that such cyclic tetramers could not be polymerized. In addition, the use of acidic catalysts for preparing the oils has a serious limitation. Many useful silicone oils have small quantities of vinyl groups for use in vinyl to silicone hydride cures. The acidic catalysts can react with the vinyl groups and cause contamination of the oil.

Diorganopolysiloxane gums having a viscosity that varies from 10,000 to 200,000,000 centipoise viscosity at 25°C., have been produced for use as the basic ingredient in heat vulcanizable silicone rubber compositions, utilizing as starting materials, cyclicsiloxanes. The usual procedure is to begin with diorganochlorosilanes of high purity, to hydrolyze such diorganochlorosilanes in water at about room temperature, to recover the hydrolyzate and to separate the water from it, and then to add to the hydrolyzate a catalyst, such as potassium hydroxide. The resulting mixture is heated at elevated temperatures of above 100°C. for a period of time about 1 hour to 8 hours and distilling overhead leads to a large proportion of cyclic trisiloxanes, cyclic tetrasiloxanes, cyclic pentasiloxanes and the like. It is easiest to recover the cyclic tetramers from such hydrolyzate cracking mixtures.

If the sole substituent groups are methyl, vinyl or phenyl groups, such cyclic tetrasiloxanes may then be equilibrated in the presence of a catalyst, such as potassium hydroxide. Also included are chain-stoppers, e.g., disiloxanes and/or low molecular weight diorganopolysiloxanes containing triorganosiloxy terminal groups have a chain-stopping function. After methyl-substituted cyclic tetrasiloxanes are equilibrated with small amounts of potassium hydroxide at temperatures of above 150°C., there results an equilibrium mixture wherein about 85 percent of the cyclic tetrapolysiloxanes are converted into the diorganopolysiloxane gum.

At equilibrium, as much of the tetrasiloxanes is being formed into the diorganopolysiloxane gum as is the diorganopolysiloxane gum breaking down and reforming cyclic siloxanes. With methyl substitution, at most only 85 percent of the original cyclic tetrasiloxanes can be converted to the desired diorganopolysiloxane gum and the other 15% by weight of the mixtures is cyclic siloxane.

At equilibrium, the catalyst is neutralized and the volatiles (including cyclics) are removed to leave desired diorganopolysiloxane gum, having a viscosity, e.g., of from 1,000 to 200,000,000 centipoise viscosity at 25°C.

In distinct contrast, however, when attempts are made to form diorganopolysiloxanes wherein at least one of the organo groups attached to the silicon atom is an aliphatic radical or halogenated aliphatic radical of three carbon atoms or more, it is found that tetracyclic siloxanes and higher cyclic siloxanes, such as pentacyclic siloxanes and hexacyclic siloxanes will not be useful in an equilibration procedure such as that described above. Specifically, if such cyclic tetrasiloxanes contain at least one organo substituent group on the silicon atom which is aliphatic or haloaliphatic of three carbon atoms or more, then at the equilibration point, there will be a very low, commercially unsuccessful yield of diorganopolysiloxane gum. Illustratively, only 10 to 20 percent of the cyclic tetrasiloxane or higher cyclic siloxane can be converted to the diorganopolysiloxane gum, as contrasted to the 85% by weight yield which is easily obtained with octamethyltetrasiloxanes.

The state of the art is shown, for example, in Pierce et al., U.S. Pat. No. 2,979,519, which is incorporated by reference. It is taught therein that commercially successful rubbers cannot be prepared by known methods from cyclic siloxanes of the formula,

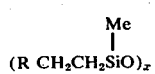

$$(\text{R CH}_2\text{CH}_2\text{SiO})_x\overset{\text{Me}}{|}$$

where $x$ is 4 or more, e.g., the tetramers, pentamers, etc. In the publically available file of the Pierce et al patent, it is disclosed moreover that diorganopolysiloxane gums of high molecular weight cannot be formed from cyclic tetrasiloxanes where one of the substituent groups in the cyclic polysiloxane contains 3 carbon atoms or more and, specifically, one which contains a radical in which R is perfluoroalkyl. U.S. Pat. No. 2,979,519, and its publically available file, teach that although high molecular weight diorganopolysiloxane gums are not formed by known methods from such tetrasiloxanes, they can readily be formed from the corresponding cyclic trisiloxanes.

If low molecular weight polysiloxane oils having a low viscosity and having at least one substituent group comprising alkyl or haloalkyl of at least 3 carbon atoms are desired, it has been found that such oils also are formed from cyclic tetrasiloxanes by known methods only in low yields, such as 10 to 15 percent. Moreover, after analysis the product is found to be predominately composed of cyclics rather than the desired low viscosity desired polymers at termination.

A further difficulty in using the process of Pierce et al to form low molecular weight polysiloxane oils even from cyclic trisiloxanes is that such cyclic trisiloxanes immediately react to form high molecular weight polymers under the stated conditions. Thus, even if there is used an exceptionally large amount of chain-stopper in the reaction mixture, the reaction of U.S. Pat. No.

2,979,519 cannot be controlled to form low molecular weight polymers.

A further difficulty with the Pierce et al procedure is that the cyclic trisiloxanes, which are required, are formed only in low yield during the initial cracking of the hydrolyzate with potassium hydroxide. The cyclic tetrasiloxane is formed in greater amounts. This requires the utilization of an energy-inefficient high reflux distillation procedure to maximize the yield of cyclic trisiloxanes from the cracking process. This means that even though the cyclic trisiloxanes have tended to react more readily by known procedures, overall, the process for forming polymers from cyclic trisiloxanes is still more expensive than it would have been if a successful method is provided for using cyclic tetrasiloxanes.

It has now been unexpectedly found that at certain low temperature ranges, which have not been envisioned previously, and in the presence of certain selected catalysts, cyclic tetrasiloxanes wherein at least one of the organo substituent groups appended to the silicon atom is an aliphatic or haloaliphatic radical of 3 carbon atoms or more, such as $-CH_2CH_2R^5R^5$ being, e.g., a perfluoroalkyl radical, can be readily equilibrated in high yields. The cyclic tetrasiloxanes can be equilibrated to produce either low molecular weight oils, or high molecular weight diorganopolysiloxane gums, the latter suitable for forming heat vulcanizable silicone rubber compositions. This application is primarily concerned with the production of oils.

It is, accordingly, a principal object of the present invention to provide for a process for producing low molecular weight diorganopolysiloxane oils in high yield wherein one of the organo groups attached to the silicon atom is an aliphatic or haloaliphatic radical of at least 3 carbon atoms or more.

It is an object of this invention to provide a means for producing low molecular weight diorganopolysiloxane oils, in which one of the organo groups attached to the silicon atom is an aliphatic or haloaliphatic radical of 3 carbon atoms or more from a cyclic tetrasiloxane and/or mixtures of cyclic tetrasiloxanes containing such groups.

Still another object of the present invention is to provide a process for producing low molecular weight diorganopolysiloxane oils having a viscosity from 50 to 100,000 centipoise at 25°C., wherein at least one of the organo groups attached to the silicon atoms is an aliphatic or haloaliphatic radical of 3 carbon atoms or more, by equilibrating cyclic tetrasiloxanes and mixtures of cyclic tetrasiloxanes at relatively low temperatures in the presence of selected catalysts.

An additional object of the present invention is to provide a process for producing diorganopolysiloxane oils having a viscosity from 50 to 100,000 centipoise at 25°C., wherein at least one of the organo groups attached to the silicon atoms is $-CH_2CH_2R^5$, and wherein $R^5$ is perfluoroalkyl, using cyclic tetrasiloxanes as starting materials.

A further object is to produce uncontaminated vinyl containing fluorosilicone oils by polymerizing a fluorosilicone cyclic tetramer with a non-acidic catalyst which is incapable of reacting with any vinyl groups.

SUMMARY OF THE INVENTION

In accordance with the foregoing objects, there is provided by the present invention a process for producing diorganopolysiloxane oils having a viscosity from 50 to 100,000 centipoise at 25°C., wherein at least one of the organo groups attached to the silicon atoms is aliphatic or haloaliphatic of 3 carbon atoms or more, said process comprising (a) reacting a cyclic polysiloxane of the formula, (1) 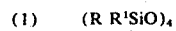  $(R\ R'SiO)_4$ and mixtures of such polysiloxanes, at a temperature in the range of 0° to 90°C. in the presence of 5 to 300 parts per million of a catalyst selected from cesium hydroxide, a silanolate thereof, and a compound of the formula, (2) 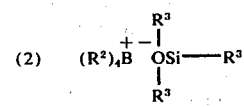

wherein $R^2$ is alkyl of 1 to 8 carbon atoms, cycloalkyl of 4 to 8 carbon atoms, and phenyl, B is nitrogen or phosphorous, $R^3$ is alkyl of 1 to 8 carbon atoms, cycloalkyl of 4 to 8 carbon atoms, phenyl, a siloxane chain of unit formula $R_a^4 SiO_{4-a/2}$, and mixtures thereof, where $R^4$ is monovalent hydrocarbon or halogenated monovalent hydrocarbon, and a is from 1.5 to 2.5, and (b) neutralizing the catalyst in the reaction mixture after equilibrium has been reached, and wherein R is methyl, ethyl, vinyl or phenyl and R' is alkyl, halogenated alkyl and cycloalkyl of 3 to 8 carbon atoms.

In preferred embodiments, after equilibrium has been reached, the catalyst will be neutralized with an inorganic acid, such as phosphoric acid or an organosilane compound of the formula $R_b^6 SiX_{4-b}$, where $R^6$ is alkyl, cycloalkyl, vinyl or phenyl, preferably, alkyl or cycloalkyl of 1 to 8 carbon atoms, and X is of bromine or chlorine, and b is from 0 to 3.

In preferred embodiments, the diorganopolysiloxane oil product is produced in essentially pure form, as follows: After the equilibrium and neutralization steps, the reaction mixture is heated to 150° to 200°C. at a vacuum of 1 to 100 millimeters of mercury and all volatiles are stripped leaving the desired product. The cyclic tetrasiloxane is equilibrated to form the diorganopolysiloxane oil from ¼ hour to 10 hours, and, preferably, from 20 minutes to 10 hours. For maximum efficiency, the cyclic tetrasiloxanes should contain less than 20 parts per million of trifunctional silanes, less than 200 parts per million of monofunctional siloxanes, 0 to 5% by weight of cyclic siloxanes other than the tetrasiloxanes, and less than 10 parts per million of water. Preferably, the R' substituent radical in the tetrasiloxanes is $R^5CH_2CH_2$, where $R^5$ is a perfluoroalkyl radical of 1 to 6 carbon atoms, especially preferably, trifluoromethyl. The process will produce a low molecular weight oil of from 50 to 100,000 centipoise viscosity at 25°C. The molecular weight, as will be obvious to those skilled in this art, will be controlled by adding a chain-stopper to the cyclic tetramer before equilibration. More chain-stopper will produce lower viscosities and vice versa.

The process of this invention will readily produce low molecular weight diorganopolysiloxane oils. These are useful in making low viscosity greases, low viscosity defoamers, and when $R_5$ is perfluoroalkyl, the oils are effective as plasticizers in fluorocarbon and other oil-resistant rubbers.

DETAILED DESCRIPTION OF THE INVENTION

The R and R' radicals in the cyclic tetrasiloxanes (Formula I) above, can be monovalent hydrocarbon radicals and halogenated monovalent hydrocarbon radicals that are typically appended to silicon atoms. Furthermore, it is required that one of the two, e.g., at least the R' radical contain 3 carbon atoms or more. In Formula (1), above, R is methyl, ethyl, vinyl or phenyl, and R' alkyl, such as propyl, butyl, and the like, of 3 to 8 carbon atoms; halogenated alkyl, such as 3-chloropropyl, 4-chlorobutyl, 3-fluoropropyl, 3,3-difluoropropyl, 3,3,3-trifluoropropyl, and the like, of up to 8 carbon atoms, and cycloalkyl of 5 to 8 carbon atoms, such as cyclopentyl, cyclohexyl, cycloheptyl, and the like. Preferably, R' is a substituent, such as $-CH_2CH_2R^5$, wherein $R^5$ is perfluoroalkyl of 1 to 6 carbon atoms, such as perfluoromethyl, perfluoroethyl and the like. More preferably, R' is 3,3,3-trifluoropropyl, and R is methyl or ethyl.

In Formula (2), $R^2$ radical is generally monovalent hydrocarbon, halogenated monovalent hydrocarbon of 1 to 8 carbon atoms and, more preferably, is alkyl of 1 to 8 carbon atoms, such as methyl, ethyl, propyl, and the like; cycloalkyl of 4 to 8 carbon atoms, such as cyclohexyl, cycloheptyl, and the like or phenyl.

$R^3$ in Formula (2) above, may in addition be monovalent hydrocarbon or halogenated monovalent hydrocarbon of the type generally associated with substituent groups on silicon atoms and is preferably alkyl of 1 to 8 carbon atoms, such as methyl, ethyl, propyl, butyl, and the like; cycloalkyl of 4 to 8 carbon atoms, such as cyclopentyl, cyclohexyl, cycloheptyl or aryl, such as phenyl. The $R^3$ radical may also be a polysiloxane polymeric substituent which is a linear polymeric silicone material having the unit formula $R_a^4 SiO_{4-a/2}$, where $R^4$ is monovalent hydrocarbon or halogenated monovalent hydrocarbon and, preferably, is alkyl of 1 to 8 carbon atoms; cycloalkyl of 4 to 8 carbon atoms, vinyl or phenyl, and $a$ in the unit formula is from 1.5 to 2.5. Preferably, when $R^3$ is a polymeric chain, the chain is linear, and $R^4$ radical methyl, phenyl, vinyl or 3,3,3-trifluoropropyl, and $a$ in the unit formula is from 1.98 to 2.01.

In Formula (2), preferably, two of the $R^3$ groups are alkyl of 1 to 8 carbon atoms, phenyl, or vinyl and the other $R^3$ is a polysiloxane chain of the unit formula indicated above, where $R^4$ is methyl, vinyl, phenyl or 3,3,3-trifluoropropyl, or a mixture of such radicals, and $a$ in the unit formula is from 1.98 to 2.01.

The process of this invention begins with the production of cyclic tetrasiloxanes, preferably obtained by first using a diorganodihalogensilane of formula R'R-SiX$_2$, where R and R' are as defined above for Formula (1), and X is a halogen, such as chlorine or bromine, and preferably is chlorine. Such diorganodihalogensilanes, preferably diorganodichlorosilanes, at a purity of at least 99% by weight are added to water at room temperature. Preferably, about 2 to 10 moles of water per mole of the diorganodihalogensilane is used. Most preferably, after the diorganodihalosilanes have been added to the water, the hydrolysis mixture will contain 20% by weight of HCl. Although the hydrolysis can be carried out in the absence of a solvent, it may be carried out in the presence of a water-immiscible solvent such as, for example, toluene, xylene, benzene, and the like. The use of a solvent facilitates the separation of the hydrolyzate from the aqueous acid solution. Thus, prior to the addition of the organohalosilanes to the water, preferably, either a solvent may be added to the water, or the solvent may be added after the organohalosilanes and mixtures of organohalosilanes are added to the water. Most preferably, the water-immiscible organic solvent is added to the water prior to the addition of the diorganodihalosilanes. The water-immiscible solvents must be chosen such that the hydrolysis product is soluble in such solvents.

In all cases, it is preferred that the diorganodihalosilanes be of high purity and, preferably, 99% by weight pure, and this prevents undesirable impurities such as trifunctional siloxane impurities from being included in the hydrolyzate. The organohalosilanes will be added to the water and, if used, the water-immiscible solvent, during a period of ½ hour to 2 hours, with agitation. The hydrolyzate which becomes dissolved in the water-immiscible solvent phase is then separated from the water phase. The hydrolyzate is then neutralized with a mild base, such as sodium bicarbonate, to a pH of about 7 to 8 so as to neutralize any residual amounts of acid, specifically any hydrochloric acid that might become entrapped with the hydrolyzate, especially if a water-immiscible organic solvent is present. The hydrolyzate which preferably is dissolved in the water-immiscible organic solvent phase is mostly cyclic polysiloxanes containing from 3 silicon atoms to 10 silicon atoms and some low molecular weight linear silanol end-stopped diorganopolysiloxanes. The hydrolyzate is then heated at elevated temperatures, if a water-immiscible organic solvent is used, so as to remove all the solvent by overhead distillation from the siloxane hydrolyzate. The hydrolyzate, from which most of the solvent has been removed, may then be cracked by adding from 0.1 to 5% by weight, and preferably, from 0.1 to 2% by weight, of a cracking catalyst such as potassium hydroxide, or cesium hydroxide. Preferably, the amount of catalyst comprises from 0.5 to 2% by weight of the hydrolyzate.

The resulting hydrolyzate and cracking catalyst mixture is then heated at elevated temperatures of above 150°C., e.g., from 150° to 200°C., and, preferably, under a vacuum of 1 to 100 millimeters of mercury and more preferably, under a vacuum of 5 to 40 millimeters of mercury for a period of time of from 1 hour to 5 hours. During such heating, there is continually distilled overhead a mixture of cyclic polysiloxanes and specifically cyclic tripolysiloxanes, cyclic tetrapolysiloxanes and cyclic pentapolysiloxanes. This cracking procedure with potassium hydroxide, or cesium hydroxide, will maximize formation of the above three types of cyclics. For example, 95% by weight of the hydrolyzate can be converted to cyclic trisiloxanes, cyclic tetrasiloxanes and cyclic pentasiloxanes. This maximizes the formation of the cyclic tetrapolysiloxanes from the initial hydrolyzate, and these are the cyclic tetrapolysiloxanes which are used in the process of the present invention. As will be obvious a solvent may be utilized to aid cracking. Any such solvent, e.g., a cracker process oil must be a very high boiling so that it will not be distilled overhead along with the cyclic trisiloxanes, the cyclic tetrasiloxanes and the cyclic pentasiloxanes.

The cyclic tetrasiloxanes can be separated by known distillation procedures from the cyclic trisiloxanes and the cyclic pentasiloxanes by distilling the mixture of cyclic polysiloxanes at temperatures in the neighborhood of 80° to 200°C. and under pressure of from 1 to 100 millimeters of mercury pressure and, more preferably, at a pressure of anywhere from 1 to 20 millimeters of mercury. Such a distillation procedure will lead to essentially pure cyclic tetrasiloxanes and the cyclic tri- and pentasiloxanes will be recycled back into the cracking vessel. If they are mixed with additional hydrolyzate, and subjected to the cracking procedure, described previously, they will again produce a mixture of cyclic trisiloxanes, cyclic tetrasiloxanes and cyclic pentasiloxanes in 95 percent yield. Such distillation purification procedures will lead to essentially pure cyclic tetrasiloxane of Formula (1), in 70 to 80 percent yield from the siloxane hydrolyzate. The cyclic tetrasiloxane will contain less than 200 parts per million of monofunctional siloxy units, less than 20 parts per million of trifunctional siloxy units and from 0 to 5% by weight of other cyclic siloxanes, that is, cyclic trisiloxanes or cyclic pentasiloxanes. These impurities should be controlled. If there is more than the above indicated amount of monofunctional siloxy units or trifunctional siloxy units, then the cyclic tetrasiloxane has a tendency to gel during equilibration to form the oil or the viscosity of the oil could vary considerably from the intended viscosity.

Preferably, also, less than 10 parts per million of water will be present in the cyclic tetrasiloxanes or mixtures of cyclic tetrasiloxanes of Formula (1), above, before use in the equilibration reaction. To lower the water content, essentially pure cyclic tetrasiloxanes of Formula (1) above, are heated to 100°C. or above with a nitrogen purge. This effectively reduces the water content of the cyclic tetrasiloxanes to less than 10 parts per million. If there is substantially more than this amount of water present in the cyclic tetrasiloxanes, then the desired low molecular weight diorganopolysiloxane oil will contain silanol end-blocked chains which are undesirable in many applications such as conversion of the oil to a grease.

To produce the oil, cyclic tetrapolysiloxane of Formula (1) above, as identified, is placed in a suitable vessel. Preferably, no solvent will be used with the cyclic tetrapolysiloxane of Formula (1) above. Two critical aspects, namely, the temperature of reaction and the nature of the catalyst will be controlled. Illustratively, from 5 to 300 parts per million and, more preferably, from 10 to 100 parts per million of the catalyst of Formula (2) above will be used. The reaction must be carried out at a temperature of between 0° to 90°C. and, more preferably, at a temperature of between 15° to 40°C. If a temperature below 0° or a temperature above 90°C. is utilized, the desired low molecular weight diorganopolysiloxane oil will not be formed in high yields from the cyclic tetrasiloxanes of Formula (1) above. Moreover, the polymerization rate will be too slow to be commercially attractive. The highest yield of the low molecular weight diorganopolysiloxane oil is obtained when equilibration temperature is between 5°C. to 40°C. with all of the catalysts, except for cesium hydroxide. Cesium hydroxide is preferably used at a reaction temperature of 70°C. to 90°C. Cesium hydroxide is, of course, a well known material, and is commercially available. Catalysts of Formula (2) above are well known in silicone chemistry, and are obtained by reacting, for example, a tetraorgano ammonium hydroxide with any diorganopolysiloxane fluid or even a cyclic polysiloxane, such as octamethylcyclotetrasiloxane. In Formula (2) above, if B is phosphorous, the catalyst can be obtained by reacting a tetraorgano phosphonium hydroxide compound which also is well known in the art, with any commercially linear polysiloxane fluid, or with any cyclic polysiloxane, such as octamethyltetracyclopolysiloxane.

The cyclic tetrasiloxane of Formula (1) above and the catalyst are heated or cooled at the indicated temperature range for a period of time of from ¼ hour to 10 hours, preferably, from 20 minutes to 10 hours, during which point equilibration is reached. At the end, the mixture will comprise from 50 to 70% by weight of the desired low molecular weight oil based on the cyclic tetrasiloxane starting material. Obviously, 20 to 30% of the mixture will comprise cyclic polysiloxanes of Formula (1) at the equilibration point, as much of the cyclic polysiloxanes being formed into the diorganopolysiloxane oil as there is of the diorganopolysiloxane oil breaking up to form cyclic polysiloxanes of Formula (1). When this equilibration point has been reached, the reaction mixture is cooled and there is added an agent to neutralize the catalyst. As is mentioned above, many neutralizing agents may be used, but preferably, there is used either phosphoric acid, or an organohalosilane or halosilane of the formula, $R_b^6SiX_{4-b}$, where $R^6$ is alkyl, cycloalkyl, vinyl radicals or phenyl wherein alkyl and cycloalkyl have from 1 to 8 carbon atoms and X is bromine or chlorine, and $b$ is from 0 to 3.

After neutralization, the reaction mixture is heated at elevated temperatures as, for example, from 150° to 200°C. under a vacuum of 1 to 100 millimeters of mercury, to strip off all cyclic polysiloxanes, and these can be recycled into the equilibration vessel. There is thus obtained a low molecular weight diorganopolysiloxane oil of the recited characteristics.

The viscosity of the oil is controlled by known means. For example, to the equilibration vessel, a chain-stopper is added with the cyclic tetrasiloxanes of Formula (1) above, and the catalyst. Typically, such chain-stoppers will be disiloxanes and low molecular weight diorganopolysiloxanes having triorganosiloxy terminal units, i.e., those having monofunctional terminal units. The organo groups in such chain-stoppers typically are selected from alkyl of 1 to 8 carbon atoms, vinyl, phenyl or cycloalkyl of 4 to 8 carbon atoms and, also, haloalkyl radicals of from 1 to 8 carbon atoms, such as trifluoropropyl. As is obvious, the amount of chain-stopper to be utilized in the equilibration vessel will be such that the desired final molecular weight, or viscosity, of the diorganopolysiloxane oil is formed. Merely by way of illustration, if for 100 parts of cyclic tetramer, there is used 12 parts of tetramethyldivinyldisiloxane, the resulting product will have a viscosity in the neighborhood of 50 centipoise, if 4 g. of dimethylvinylsiloxytrifluoropropylmethylpentasiloxytrimethylsiloxane is used, the viscosity will be 800 centipoise; and if 0.12 g. of the latter is used the viscosity will be about 100,000 centipoise at 25°C.

Obviously, such oils can be compounded to form greases, and they can be mixed with gums, fillers, such as fumed silica or precipitated silica; extending fillers, such as zinc oxide, iron oxide, titanium oxide, diatomaceous earth, and the like; heat aging additives, such as iron oxide; pigments and all other conventional additives to produce useful compositions.

DESCRIPTION OF THE PREFERRED EMBODIMENTS

The following examples are given for the purpose of illustrating the present invention and are not to be construed in any way or manner to limit the invention.

EXAMPLE 1

One hundred parts of 1,3,5,7-tetramethyltetrakis-1,3,-5,7-(3,3,3-trifluoropropyl)cyclotetrasiloxane is placed in a resin reaction flask equipped with a mechanical stirrer. Four grams of $M'D_5''M$ ($M'$=dimethylvinylsiloxy; and $D''$=trifluoropropylmethylsiloxy; M=dimethylvinylsily) is added as a chain-stopper. The flask is heated to 80°C., purged with dry nitrogen for 30 minutes to dry the cyclic polysiloxane and chain-stopper mixture such that it contains less than 10 parts per million of water. The flask is heated and maintained at 80°C., and 40 ppm of cesium, as cesium silanolate, catalyst is added. The polymerization is allowed to continue for 6 hours. Then the catalyst is neutralized and deactivated by adding a 1% solution of phosphoric acid in tetrahydrofuran. The batch is now heated to 180°C. and vacuum of 2 mm Hg is applied. Volatiles are distilled from the batch and are collected in a trap cooled in dry ice/acetone. The trap contents are mostly cyclic trimer and pentamer. The yield of stripped oily (methyl) (3,3,3-trifluoromethylpropyl) polysiloxane terminated with dimethylvinyl groups is 55 percent. The polymeric oil has a viscosity of 800 centipose at 25°C.

EXAMPLE 2

Thirty parts of 1,3,5,7-tetramethyl-1,3,5,7-tetrakis-(3,3,3-trifluoropropyl)cyclotetrasiloxane is placed in a 100 cc resin flask equipped with a mechanical stirrer and nitrogen drying stream. There is added 0.4 ml. of a chain-stopper consisting of a dimethylvinyl terminated methyl-3,3,3-trifluoropropyl polysiloxane averaging 5 siloxane units. The batch is brought to 20°C. and maintained as dry nitrogen is swept through to dry the reactants for 20 minutes. Then 0.3 ml. of a solution of cesium hydroxide catalyst in methanol is added and the nitrogen purge rate is accelerated to drive off the methanol. The batch temperature is brought to 70°C. A viscosity increase is noted after 45 minutes and the batch is maintained at 70°C. for 12 hours. One drop of dimethyldichlorosilane is added to neutralize and deactivate the cesium hydroxide catalyst. The batch is raised to 125°C. and 1 mm Hg of vacuum is applied to remove volatiles. The volatiles are weighed. Analyses of the resulting oil indicates that the volatiles content of the batch is 40 percent, before stripping. The polymeric product obtained in 60 percent yield, has 6000 centipoise at 25°C. and comprises a dimethylvinyl terminated (methyl) (3,3,3-trifluoropropyl)polysiloxane.

EXAMPLE 3

The procedure of Example 1 is repeated, substituting 12 g. of tetramethyldivinylsiloxane as a chain-stopper. The product oil has a viscosity of about 50 centipoise at 25°C.

EXAMPLE 4

The procedure of Example 2 is repeated, substituting about 0.12 ml. of the chain-stopper. The product oil has a viscosity of about 100,000 centipoise at 25°C.

It can be seen that the present invention provides a simple and straight-forward procedure for producing low molecular weight diorganopolysiloxane oils from cyclic tetrasiloxanes, in which one of the substituent groups attached to the silicon atom is aliphatic or haloaliphatic of 3 carbon atoms or more. Such oils may be advantageously used as defoamers, fluids, plasticizers or as ingredients in silicone compositions having outstanding properties. The fluorosilicones have increased resistance to degradation by hydrocarbon oils. Obviously, many variations will suggest themselves to those skilled in the art in the light of the above detailed description. All such variations are within the full intended scope of the appended claims.

I claim:

1. A process for producing a diorganopolysiloxane oil having a viscosity from 50 to 100,000 centipoise at 25°C. where at least one of the organo groups is an aliphatic or haloaliphatic radical of at least 3 carbon atoms or more comprising (a) reacting cyclic polysiloxanes of the formula,

and mixtures thereof, at a temperature in the range of 0° to 90°C. in the presence of 5 to 300 parts per million of a catalyst selected from the class consisting of CsOH, silanolates thereof, and compounds of the formula,

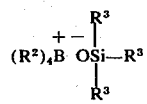

where $R^2$ is selected from the class consisting of alkyl radicals of 1 to 8 carbon atoms, cycloalkyl radicals of 4 to 8 carbon atoms and phenyl, B is selected from the class consisting of nitrogen and phosphorous, $R^3$ is selected from the class consisting of alkyl radicals of 1 to 8 carbon atoms, cycloalkyl radicals of 4 to 8 carbon atoms, phenyl, siloxane chains of the unit formula, $R_a^4 SiO_{4-a/2}$ and mixtures thereof where $R^4$ is selected from the class consisting of monovalent hydrocarbon radicals and halogenated monovalent hydrocarbon radicals, and $a$ is from 1.5 to 2.5, and (b) neutralizing the catalyst in the reaction mixture after equilibration has been reached, where R is selected from the class consisting of methyl, ethyl, vinyl and phenyl, and R' is selected from the class consisting of alkyl radicals, halogenated alkyl radicals and cycloalkyl radicals of 3 to 8 carbon atoms.

2. A process as defined in claim 1 wherein the catalyst is neutralized with an ingredient selected from the class consisting of phosphoric acid and a compound of the formula, $R_b^6 SiX_{4-b}$, where $R^6$ is selected from the class consisting of alkyl radicals, cycloalkyl radicals, vinyl radicals and phenyl radicals, X is selected from the class consisting of bromine and chlorine, and $b$ is from 0 to 3.

3. A process as defined in claim 1 including after step (b) the step further comprising heating the reaction mixture to 150° to 200°C. at a vacuum of 1 to 100 mm of Hg to strip off all volatiles so as to result in the desired product.

4. A process as defined in claim 1 wherein the cyclic polysiloxane is reacted with the catalyst for a period of time varying from ¼ hour to 10 hours.

5. A process as defined in claim 1 wherein the cyclic polysiloxanes and mixtures thereof contain less than 20 parts per million of trifunctional siloxanes, less than 200 parts per million of monofunctional siloxanes, and 0 to 50% by weight of other cyclic polysiloxanes and less than 10 parts per million of water.

6. A process as defined in claim 1 wherein R' is $R^5CH_2CH_2-$ and $R^5$ is a perfluoroalkyl radical of 1 to 6 carbon atoms.

7. A process for producing a diorganopolysiloxane oil having a viscosity from 50 to 100,000 centipoise at 25°C. where at least one of the organo groups is an aliphatic or haloaliphatic radical of 3 carbon atoms or more comprising (a) hydrolyzing in a water and a water-immiscible organic solvent mixture, a silane of the formula,

R R' SiX₂ and mixtures of said silane, where R is selected from the class consisting of methyl, ethyl, vinyl and phenyl and R' is selected from the class consisting of alkyl radicals, halogenated alkyl radicals and cycloalkyl radicals of 3 to 8 carbon atoms, and X is halogen; (b) separating the water and water-immiscible organic solvent from the hydrolyzate; (c) adding 0.5 to 2% by weight of a catalyst selected from the class consisting of KOH, and CsOH to the hydrolyzate and heating the hydrolyzate to 150°C. to 200°C; (d) removing overhead a mixture of cyclic polysiloxanes and transferring such cyclic polysiloxanes into a distillation column; (e) separating by distillation at a temperature of 80°–100°C. and 1 to 50 mm of Hg vacuum essentially pure tetracyclic polysiloxanes of the formula, (R R' SiO)₄ and mixtures thereof, where R and R' are as previously defined; (f) heating the tetracyclic polysiloxanes above 100°C. with a nitrogen purge to reduce the water content to less than 10 parts per million; (g) reacting the cyclic tetrapolysiloxanes at a temperature in the range of 0° to 90°C. in the presence of 5 to 300 parts per million of a catalyst selected from the class consisting of CsOH, silanolates thereof, and compounds of the formula,

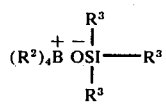

where $R^2$ is selected from the class consisting of alkyl radicals of 1 to 8 carbon atoms, cycloalkyl radicals of 4 to 8 carbon atoms and phenyl, B is selected from the class consisting of nitrogen and phosphorous, $R^3$ is selected from the class consisting of alkyl radicals of 1 to 8 carbon atoms, cycloalkyl radicals of 4 to 8 carbon atoms, phenyl, siloxane chains of the unit formula, $R_a^4 SiO_{4-a/2}$ and mixtures thereof, where $R^4$ is selected from the class consisting of monovalent hydrocarbon radicals and halogenated monovalent hydrocarbon radicals, and $a$ is from 1.5 to 2.5; and (h) neutralizing the catalyst in the reaction mixture after equilibrium has been reached.

8. A process as defined in claim 7 wherein in step (a) the amount of water is controlled such that there is formed 20% by weight of an aqueous halogen acid solution during the hydrolysis.

9. A process as defined in claim 7 wherein the catalyst is neutralized in step (h) with an ingredient selected from the class consisting of phosphoric acid and a compound of the formula,

$R_b^6 SiX_{4-b}$ where $R^6$ is selected from the class consisting of alkyl radicals, cycloalkyl radicals, vinyl radicals and phenyl radicals, X is selected from the class consisting of bromine and chlorine and $b$ is from 0 to 3.

10. A process as defined in claim 7 including after step (h) the step further comprising heating the reaction mixture to 150° to 200°C. at a vacuum of 1 to 100 mm Hg to remove all volatiles so as to result in the desired product.

11. A process as defined in claim 7 wherein in step (g) the reaction is carried out for a period of time varying from ¼ hour to 10 hours.

12. A process as defined in claim 7 wherein after step (f) the tetracyclicpolysiloxanes and mixtures thereof contain less than 20 parts per million of trifunctional siloxanes, and less than 200 parts per million of monofunctional siloxanes.

13. A process as defined in claim 7 wherein R' is $R^5CH_2CH_2-$ and $R^5$ is a perfluoroalkyl radical of 1 to 6 carbon atoms.

* * * * *

UNITED STATES PATENT AND TRADEMARK OFFICE
CERTIFICATE OF CORRECTION

PATENT NO. : 3,978,104
DATED : August 31, 1976
INVENTOR(S) : J. S. Razzano

It is certified that error appears in the above-identified patent and that said Letters Patent are hereby corrected as shown below:

Column 12, line 4 (in the formula), "SI" should read --Si--.

Signed and Sealed this

Eighth Day of March 1977

[SEAL]

Attest:

RUTH C. MASON
Attesting Officer

C. MARSHALL DANN
Commissioner of Patents and Trademarks